United States Patent
Lee (10) Patent No.: US 8,423,754 B2
(45) Date of Patent: Apr. 16, 2013

(54) COMPUTER SYSTEM AND METHOD OF BOOTING THE SAME

(75) Inventor: Kyoung Hwa Lee, Hwasung-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 391 days.

(21) Appl. No.: 12/662,276

(22) Filed: Apr. 8, 2010

(65) Prior Publication Data

US 2010/0262818 A1    Oct. 14, 2010

(30) Foreign Application Priority Data

Apr. 9, 2009    (KR) .................. 10-2009-0030727

(51) Int. Cl.
*G06F 9/24*    (2006.01)

(52) U.S. Cl.
USPC .......................................................... 713/2

(58) Field of Classification Search .................. 713/2
See application file for complete search history.

(56) References Cited

U.S. PATENT DOCUMENTS 7,707,354 B2 *    4/2010    Lee et al. ................ 711/103
8,055,888 B2 *    11/2011   Pathirane et al. .......... 713/1

2008/0177938 A1    7/2008    Yu

FOREIGN PATENT DOCUMENTS

| JP | 2006-163687 A | 6/2006 |
| KR | 10-2006-0011250 A | 2/2006 |
| KR | 10-2008-0067548 A | 7/2008 |

* cited by examiner

*Primary Examiner* — Kim Huynh
*Assistant Examiner* — Eric Chang
(74) *Attorney, Agent, or Firm* — Lee & Morse, P.C.

(57) ABSTRACT

A computer system and a method of booting a computer system using a solid state drive (SSD) as a main storage device is provided. The method includes mapping an address of a memory included in the SSD to an address used by a central processing unit (CPU) to select a boot code, uploading the boot code of an operating system (OS) stored in a non-volatile memory block included in the SSD to the memory included in the SSD, generating an interrupt signal based on a progress rate of the boot code upload, and performing a boot operation based on the boot code uploaded to the memory included in the SSD in response to the interrupt signal.

16 Claims, 6 Drawing Sheets

COMPUTER SYSTEM AND METHOD OF BOOTING THE SAME

BACKGROUND

1. Field

The present inventive concept relates to a computer system and a method of booting a computer system, and more particularly, to a method of quickly booting an operating system (OS) when a computer system is booted.

2. Descriptions of the Related Art

When power Is supplied to a conventional computer system (e.g., a personal computer (PC)), the computer system uploads an OS stored in a hard disk drive (HDD) to a random access memory (RAM) and a central processing unit (CPU) boots the computer system based on the OS uploaded to the RAM. It takes some time to read OS data from the HDD. Accordingly, OS boot time cannot be efficiently reduced just with improved disk performance.

The best way for fast booting is to permanently station an OS at RAM. However, conventional computer systems use volatile RAM. Thus, storage of the OS at the RAM that does not utilize a backup battery is not possible.

SUMMARY

Embodiments are therefore directed to a computer system and a method of booting a computer system, which substantially overcomes one or more of the problems due to the limitations and disadvantages of the related art.

It is therefore a feature of an embodiment to provide a computer system and a method of booting a computer system, by which an operating system (OS) is stored in a solid state drive (SSD) and the OS is read from the SSD and uploaded to a random access memory (RAM) included in the SSD during system boot.

It is further another feature of an embodiment to provide a computer system and a method of booting a computer system that efficiently reduces system boot time.

At least one of the above and other features and advantages may also be realized by a method of booting a computer system. The method includes mapping an address of a memory included in an SSD to an address used by a central processing unit (CPU) to select a boot code, uploading the boot code of an OS stored in a non-volatile memory block included in the SSD to the memory included in the SSD, generating an interrupt signal based on a progress rate of the boot code upload, and performing a boot operation based on the boot code uploaded to the memory included in the SSD in response to the interrupt signal.

The mapping the address may include setting the address of the memory included in the SSD to the address used by the CPU to select the boot code. The uploading the boot code may be performed in parallel with initialization of the CPU.

The memory included in the SSD may be a volatile memory. The non-volatile memory block may be a flash memory block. At this time, the uploading the boot code may be performed using a power-on auto-read operation in parallel with the initialization of the CPU. The generating the interrupt signal may include generating the interrupt signal based on completion of the uploading.

The volatile memory may include a plurality of channels, and the boot code upload and transmission of the boot code to the CPU may be simultaneously performed through the plurality of channels. The generating the interrupt signal may include generating the interrupt signal when pipelining becomes possible between the boot code upload and transmission of the boot code to the CPU.

The memory included in the SSD may be a non-volatile RAM. At this time, the uploading the booting code and the generating the interrupt signal based on the progress rate of the boot code upload may be performed at only initial boot of the computer system since the boot code is uploaded to and stored in the non-volatile RAM at the initial boot.

At least one of the above and other features and advantages may also be realized by a method of booting the computer system implemented by executing a computer program for executing the method stored in a computer readable recording medium.

At least one of the above and other features and advantages may also be realized by a computer system, including a solid state drive (SSD) including a controller, a memory, and a non-volatile memory block, a main memory, and a central processing unit (CPU) in communication with the SSD and the main memory, wherein the main memory is configured to map an address of the memory in the SSD to an address used by the CPU to select a boot code, wherein the controller is configured to upload the boot code of an operating system (OS) stored in the non-volatile memory block in the SSD to the memory in the SSD and generate an interrupt signal based on a progress rate of the boot code upload, and wherein the CPU is configured to performing a boot operation based on the boot code uploaded to the memory in the SSD in response to the interrupt signal.

The memory in the SSD may be a volatile memory. The volatile memory may include a plurality of channels, and the controller may be configured to simultaneously upload the boot code and transmit the boot code to the CPU through the plurality of channels.

The non-volatile memory block may be a flash memory block, and the controller may be configured to upload the boot code using a power-on auto-read operation and generate the interrupt signal based on completion of the uploading.

The controller may be configured to generate the interrupt signal when pipelining becomes possible between the boot code upload and transmission of the boot code to the CPU.

The memory in the SSD may be a non-volatile random access memory (RAM). The controller may be configured to upload the boot code and generate the interrupt signal based on the progress rate of the boot code upload at only initial boot of the computer system.

The computer system may include a north bridge connecting the main memory to the CPU and a south bridge connecting the SSD to the CPU.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0030727, filed on Apr. 9, 2009, in the Korean Intellectual Property Office, and entitled: "Method of Booting Computer System," is incorporated by reference herein in its entirety.

The present inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
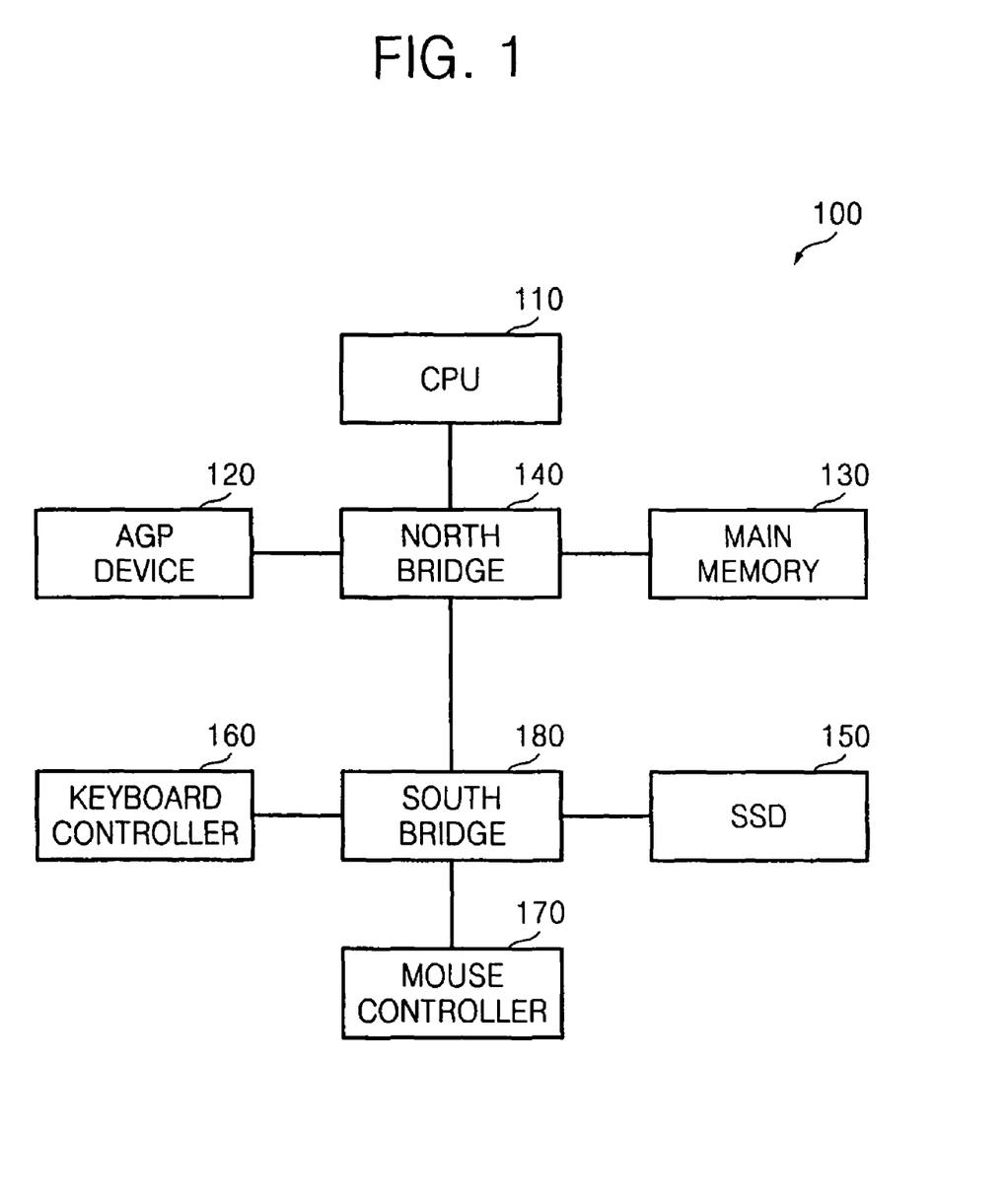
FIG. 1 illustrates a block diagram of a computer system according to some embodiments of the present inventive concept.

FIG. 1 illustrates a block diagram of a computer system 100 according to some embodiments of the present inventive concept. The computer system 100 may include a central processing unit (CPU) 110, an accelerated graphics port (AGP) device 120, a main memory 130, a north bridge 140, a solid state drive (SSD) 150, a keyboard controller 160, a mouse controller 170, and a south bridge 180.

The computer system 100 may be a personal computer (PC) that uses the SSD 150 instead of a hard disk drive (HDD) as a main storage device. The scope of the present inventive concept, however, is not restricted to the current embodiments. For instance, computer systems to which a booting method according to some embodiments of the present inventive concept can be applied include desktop computers, notebook computers, and other devices booted when power is turned on, such as personal digital assistants (PDAs), cellular telephones, MP3 players, portable multimedia players (PMPs), automotive navigation systems, and mobile Internet devices (MIDs).

The SSD 150 is a device that stores information using a semiconductor. The SSD 150 is faster and has less mechanical delay, failure rate, radiation, and noise than an HDD, and can be easily made small and light. The CPU 110, the AGP device 120, and the main memory 130 may be connected to the north bridge 140. The SSD 150, the keyboard controller 160, the mouse controller 170, and other peripheral devices (not shown) may be connected to the south bridge 180.

The north bridge 140 is an integrated circuit (IC) located at the side of a socket of the CPU 110 relative to the center of a main board. Usually, the north bridge 140 indicates a system controller including a host interface connected to the CPU 110. The south bridge 180 is an IC located at the side of a peripheral component interconnection (PCI) slot relative to the center of the main board. The south bridge 180 usually indicates a bridge to a bus connected to a host bus via a PCI bus.

AGP is a bus standard for accelerating three-dimensional (3D) graphics. The AGP device 120 may include a video card reproducing monitor images. The main memory 130 may be implemented by a volatile memory device or random access memory (RAM), but the present inventive concept is not restricted thereto.

Figure 2:
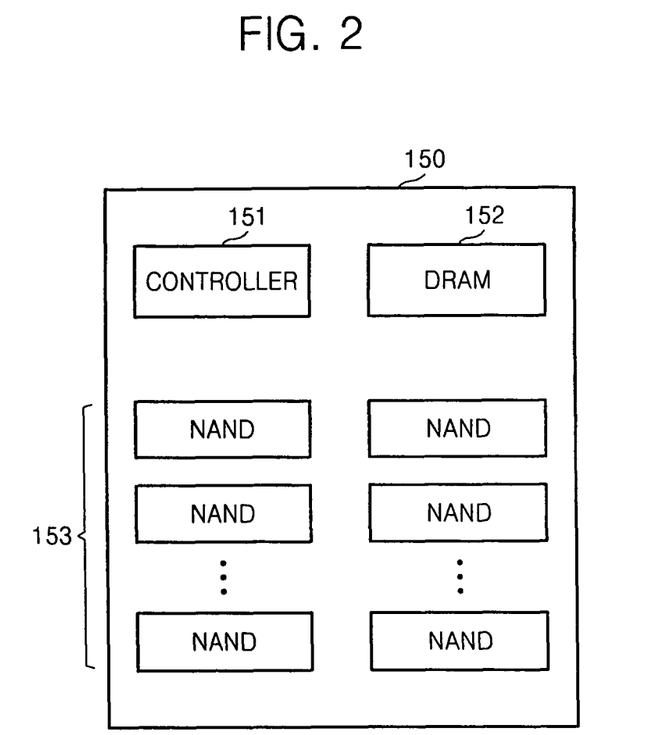
FIGS. 2 through 4 illustrate block diagrams of a solid state drive (SSD) illustrated in FIG. 1 according to different embodiments of the present inventive concept.

FIG. 2 illustrates a block diagram of the SSD 150 of FIG. 1 according to a first embodiment. Referring to FIG. 2, the SSD 150 may include a controller 151, a memory 152, and a non-volatile memory block 153.

The controller 151 controls the operation of the SSD 150. The non-volatile memory block 153 stores an operating system (OS), a variety of programs, and a variety of data. When the computer system 100 is powered on, the OS stored in the non-volatile memory block 153 is uploaded to the memory 152 and then the computer system 100 performs the boot operation based on the OS uploaded to the memory 152. The memory 152 and the non-volatile memory block 153 may be implemented by dynamic random access memory (DRAM), which is volatile, and a NAND flash memory block, respectively. The present inventive concept is not restricted to the current embodiment.

In particular, the controller 151 may upload the OS stored in the non-volatile memory block 153 to the memory 152 when the computer system is powered on. Then, the controller 151 may generate an interrupt signal and may transmit the boot code to the CPU 110.

In conventional computer systems, an OS is stored in an HDD and the OS is uploaded to a main memory during system boot. Then, the conventional computers perform the boot operation based on the OS uploaded to the main memory.

In contrast, according to some embodiments of the present inventive concept, an OS is stored in the SSD 150 in the computer system 100 and the OS is uploaded to memory 152 included in the SSD 150 during the boot. Then, the computer system 100 performs the boot operation based on the OS uploaded to the memory 152 included in the SSD 150. At this time, the address of the memory 152 needs to be set in advance to an address used by the CPU 110 to select a boot code. For instance, if the address used by the CPU 110 to select the boot code is "0", "0" needs to be mapped to the address of the memory 152 included in the SSD 150 instead of the main memory 130.

When the computer system 100 is powered on, initialization of the CPU 110 is carried out. A process of uploading the boot code stored in the non-volatile memory block 153 to the memory 152 may be carried out in parallel with the initialization of the CPU 110, thereby further reducing the boot time of the computer system 100.

When the non-volatile memory block 153 is a flash memory, the OS stored in the non-volatile memory block 153 may be uploaded to the memory 152 using a power-on auto-read operation. The power-on auto-read operation is a process of loading data at a particular location to another memory when electric power is supplied to a flash memory.

The controller 151 may generate an interrupt signal based on the progress rate of the boot code upload. Then, the CPU 110 receives the interrupt signal and performs the boot operation based on the boot code uploaded to the memory 152 included in the SSD 150. For example, the controller 151 may generate the interrupt signal when the upload of the boot code stored in the non-volatile memory block 153 is completed and then transmit the boot code to the CPU 110. In another example, the controller 151 may generate the interrupt signal when pipelining becomes possible between uploading the boot code to the memory 152 and transmitting the boot code to the CPU 110.

Pipelining is a technique where the movements of multiple instructions toward the CPU 110 or arithmetic stages of the CPU 110 executing the instructions are continuous and overlap. When pipelining is used, the computer system 100 can fetch a next instruction while the CPU 110 is executing an arithmetic operation and put the next instruction in the memory 152 included in the SSD 150 until the operation of the next instruction can be executed. By repeating this procedure, many instructions can be executed in a given time.

In the pipelining of the boot operation of the computer system 100, part of the boot code for starting the boot operation in the OS stored in the non-volatile memory block 153 is uploaded to the memory 152. Then, the controller 151 generates the interrupt signal and the CPU 110 receives the part of the boot code. While the part of the boot code is executed by the CPU 110, next part of the boot code is uploaded to the memory 152. Such procedure may be repeated, increasing the efficiency of the computer system 100. This pipelining may also used in the computer system 100 including the SSD 150 illustrated in FIGS. 3 and 4, described below.

Figure 3:
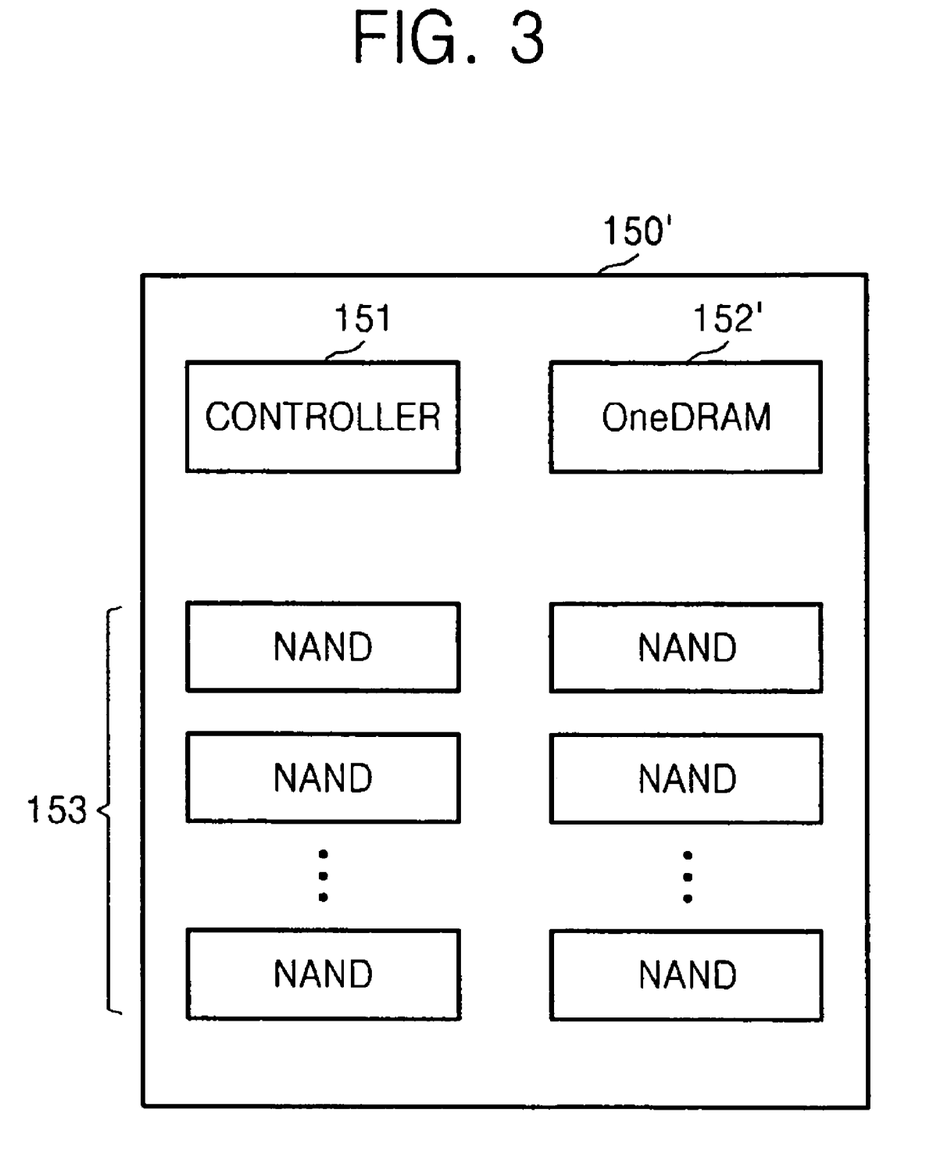

FIG. 3 illustrates a block diagram of the SSD 150' illustrated in FIG. 1 according to a second embodiment. Referring to FIG. 3, an SSD 150' may include the controller 151, a memory 152' and the non-volatile memory block 153. The elements referred to by like numbers in FIGS. 2 and 3 have the same structure and function. Thus, detailed description thereof will be omitted and only differences between the SSD 150 illustrated in FIG. 2 and the SSD 150' illustrated in FIG. 3 will be described.

Unlike the memory 152 illustrated in FIG. 2, the memory 152' illustrated in FIG. 3 is implemented by volatile memory including a plurality of channels. For instance, the memory 152' may be implemented by volatile memory with at least two channels, e.g., OneDRAM which is a fusion memory chip manufactured by Samsung. In this case, the boot code may be uploaded from the non-volatile memory block 153 to the memory 152' through a first channel and, simultaneously, the boot code uploaded to the memory 152' may be transmitted to the CPU 110 through a second channel. Accordingly, when the SSD 150 includes a plurality of channels, boot code upload time and access time of the CPU 110 to the memory 152' may be reduced and the size of the memory 152' may also be reduced.

Figure 4:
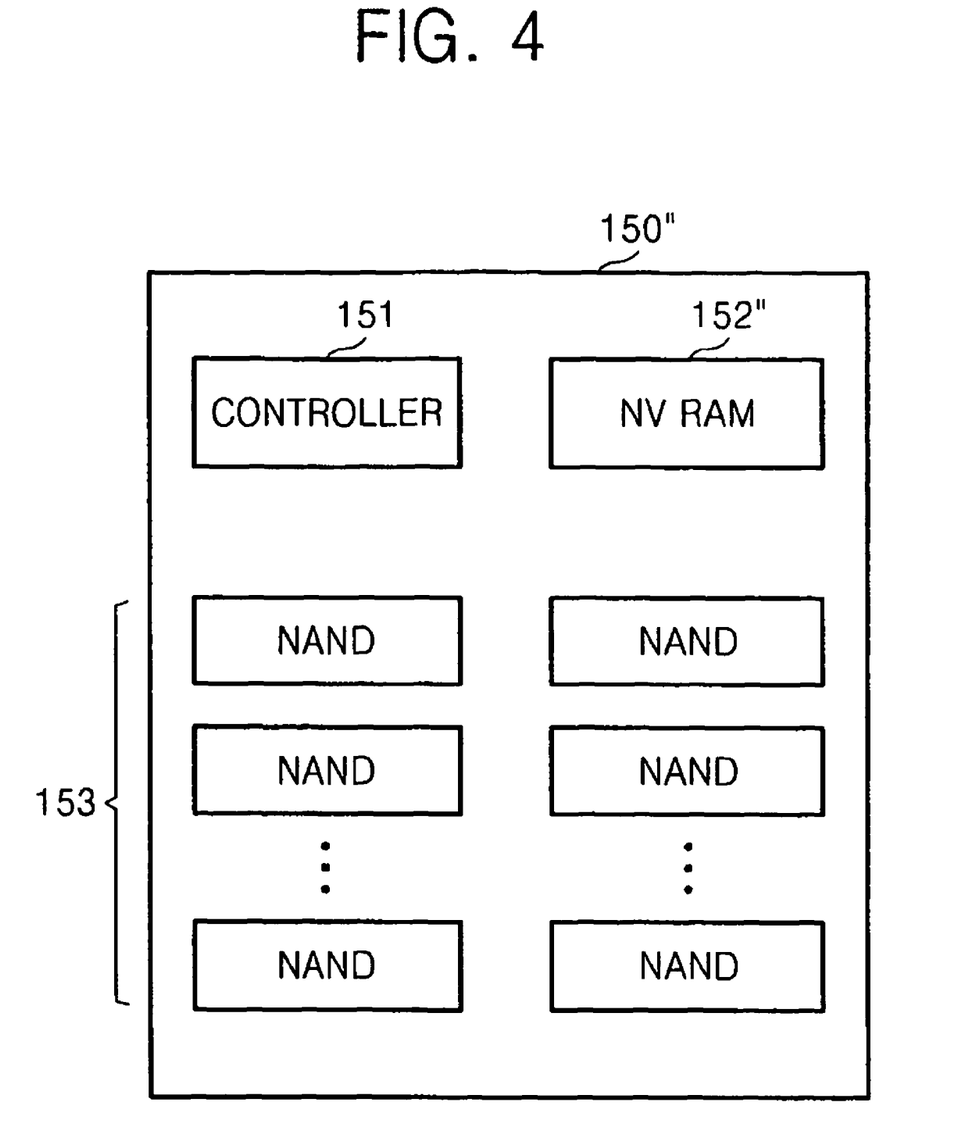

FIG. 4 illustrates a block diagram of the SSD 150" illustrated in FIG. 1 according to a third embodiment. Referring to FIG. 4, an SSD 150" may include the controller 151, a memory 152", and the non-volatile memory block 153. The elements referred to by like numbers in FIGS. 2 and 4 have the same structure and function. Thus, detailed description thereof will be omitted and only differences between the SSD 150 illustrated in FIG. 2 and the SSD 150" illustrated in FIG. 4 will be described.

Unlike the memory 152 illustrated in FIG. 2, the memory 152" illustrated in FIG. 4 may be implemented by non-volatile RAM. For instance, the memory 152" may be implemented by non-volatile phase-change RAM (PRAM).

The boot code is uploaded to the memory 152" in the SSD 150 when the computer system 100 is booted initially. Thereafter, the uploaded boot code is retained at the memory 152" even when the power is turned off. Accordingly, from the second boot, it is not necessary to upload the boot code from the non-volatile memory block 153 to the memory 152". In other words, after power is supplied, the initialized CPU 110 may immediately access the memory 152" and perform the boot operation.

At the initial boot of the computer system 100, the controller 151 may generate the interrupt signal when the boot code stored in the non-volatile memory block 153 has been uploaded completely. From the second boot of the computer system 100, however, the controller 151 does not need to generate the interrupt signal. Instead, the CPU 110 initialized after the computer system 100 is powered on immediately accesses the memory 152" and performs the boot operation. However, whenever the OS stored in the non-volatile memory block 153 is updated, the OS will need to be uploaded again.

The SSD 150 of the computer system 100 according to some embodiments of the present inventive concept may be packed in various types of packages. For example, the various packages may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP).

Figure 5:
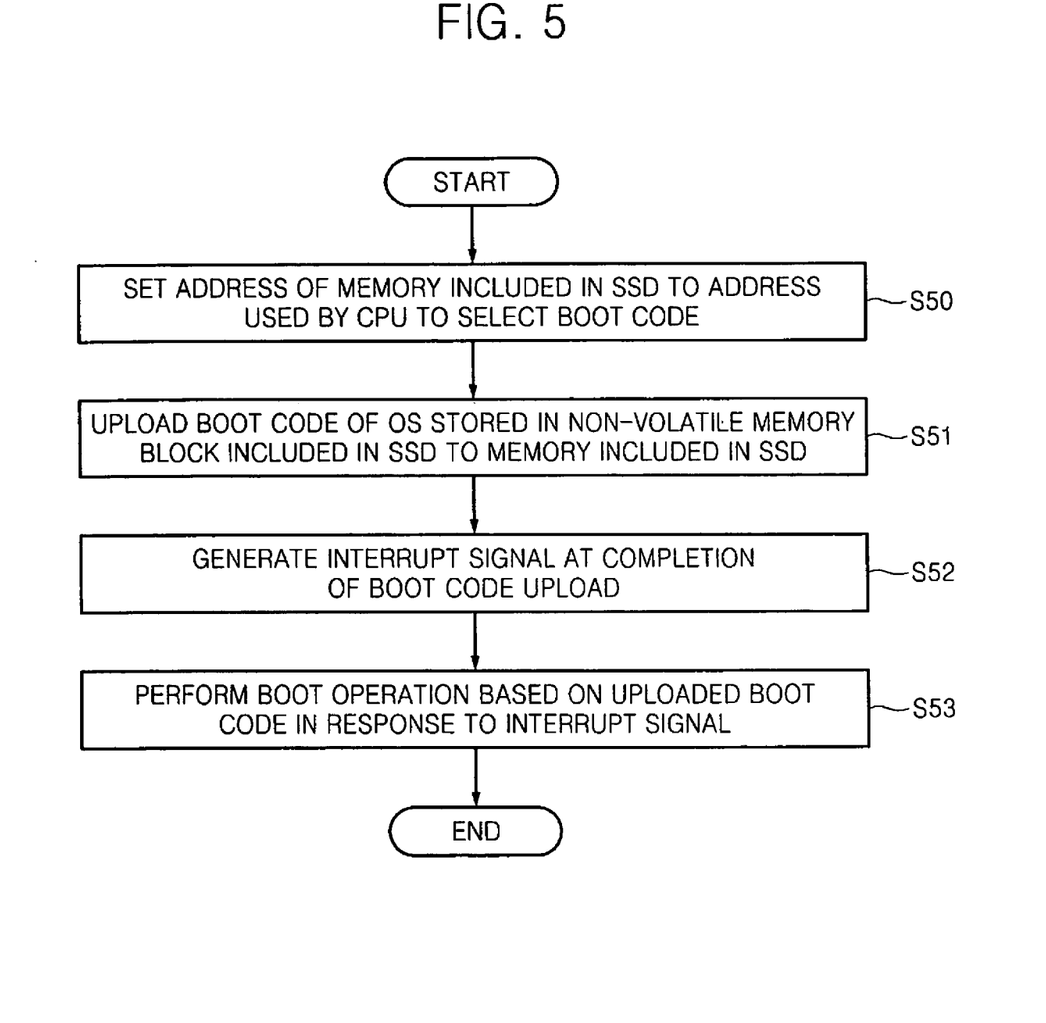
FIG. 5 illustrates a flowchart of a method of booting a computer system according to some embodiments of the present inventive concept.

FIG. 5 illustrates a flowchart of a method of booting the computer system 100 according to some embodiments of the present inventive concept. Referring to FIGS. 1 through 5, in setting of the computer system 100, address mapping between the main memory 130 and the memory 152 included in the SSD 150 is performed to set the address of the memory 152 to an address used by the CPU 110 to select a boot code in operation S50. Then, the CPU 110 initialized after power is supplied attempts accessing the memory 152 in the SSD 150 instead of the main memory 130.

The controller 151 controls the boot code of an OS stored in the non-volatile memory block 153 included in the SSD 150 to be uploaded to the memory 152 included in the SSD 150 in operation S51. When the memory 152 is a volatile memory, e.g., DRAM, the controller 151 generates an interrupt signal at the completion of the boot code upload in operation in operation S52. Thereafter, the CPU 110 accesses the memory 152 included in the SSD 150 in response to the interrupt signal and performs a boot operation based on the boot code in the memory 152 in operation S53.

Figure 6:
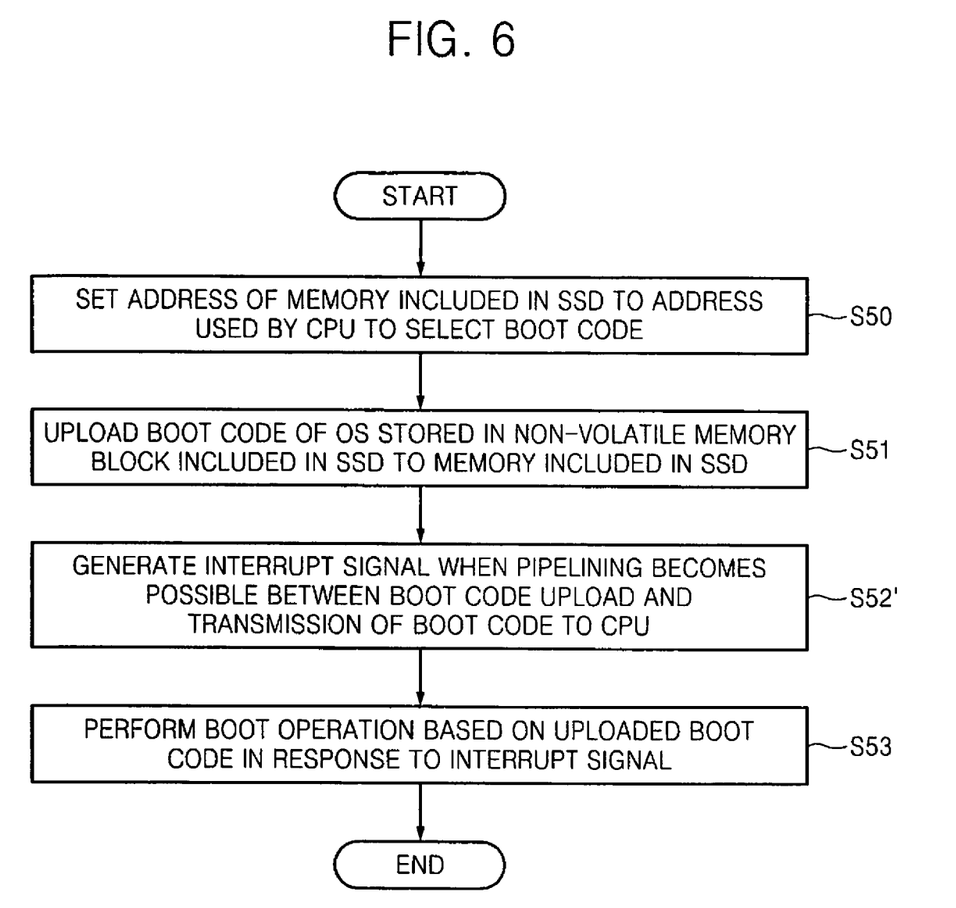
FIG. 6 illustrates a flowchart of a method of booting a computer system according to other embodiments of the present inventive concept.

FIG. 6 illustrates a flowchart of a method of booting the computer system 100 according to other embodiments of the present inventive concept. Detailed descriptions of the operations referred to by like numbers in FIGS. 5 and 6 will be omitted and only differences between the method illustrated in FIG. 5 and the method illustrated in FIG. 6 will be described.

Comparing FIGS. 5 and 6, there is a difference in generating the interrupt signal. Referring to FIG. 6, the interrupt signal is generated when pipelining becomes possible between the upload of the boot code from the non-volatile memory block 153 to the memory 152 in the SSD 150 and the transmission of the boot code from the memory 152 to the CPU 110. Due to the pipelining, the efficiency of the computer system 100 may be further increased.

As described above, according to some embodiments of the present inventive concept, during OS boot in a computer system, an OS is read from an SSD instead of an HDD and is uploaded to RAM within the SSD, and a CPU performs a boot operation based on the uploaded OS, so that system boot time is efficiently reduced. In addition, initialization of the CPU is performed in parallel with the upload of the OS to the RAM within the SSD, thereby more reducing the system boot time.

The method of booting a computer system according to some embodiments of the present inventive concept can also be embodied in hardware, software, firmware or combination thereof. When the method is embodied in software, it can be embodied as computer readable codes or programs on a computer readable recording medium. The computer readable recording medium is any data storage device that can store data which can be thereafter read by a computer system. Examples of the computer readable recording medium may include read-only memory (ROM), random-access memory (RAM), electrically erasable programmable ROM (EEPROM), and flash memory.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of booting a computer system, the method comprising:
    mapping an address of a memory in a solid state drive (SSD) to an address used by a central processing unit (CPU) to select a boot code of an operating system (OS), the memory including a plurality of channels;
    uploading the boot code stored in a non-volatile memory block in the SSD to the memory in the SSD;
    transmitting the boot code to the CPU, wherein uploading the boot code and transmitting the boot code to the CPU are simultaneously performed through the plurality of channels;
    generating an interrupt signal based on a progress rate of the boot code upload; and
    performing a boot operation based on the boot transmitted to the CPU in response to the interrupt signal.

2. The method as claimed in claim 1, wherein mapping the address comprises setting the address of the memory in the SSD to the address used by the CPU to select the boot code.

3. The method as claimed in claim 1, wherein uploading the boot code is performed in parallel with initialization of the CPU.

4. The method as claimed in claim 1, wherein the memory in the SSD is a volatile memory.

5. The method as claimed in claim 1, wherein:
    the non-volatile memory block is a flash memory block,
    uploading the boot code is performed using a power-on auto-read operation, and
    generating the interrupt signal includes generating the interrupt signal based on completion of the uploading.

6. The method as claimed in claim 1, wherein generating the interrupt signal comprises generating the interrupt signal when pipelining becomes possible between the boot code upload and transmission of the boot code to the CPU.

7. The method as claimed in claim 1, wherein the memory in the SSD is a non-volatile random access memory (RAM).

8. The method as claimed in claim 7, wherein uploading the booting code and generating the interrupt signal based on the progress rate of the boot code upload are performed at only initial boot of the computer system.

9. A non-transitory computer readable recording medium for storing a computer program for executing the method as claimed in claim 1.

10. A computer system, comprising:
    a solid state drive (SSD) including a controller, a memory having a plurality of channels, and a non-volatile memory block;
    a main memory; and
    a central processing unit (CPU) in communication with the SSD and the main memory,
    wherein the main memory is configured to map an address of the memory in the SSD to an address used by the CPU to select a boot code of an operating system (OS),
    wherein the controller is configured to simultaneously upload the boot code stored in the non-volatile memory block in the SSD to the memory in the SSD and transmit the boot code to the CPU through the plurality of channels, and to generate an interrupt signal based on a progress rate of the boot code upload, and
    wherein the CPU is configured to perform a boot operation based on the boot code transmitted to the CPU in response to the interrupt signal.

11. The computer system as claimed in claim 10, wherein the memory in the SSD is a volatile memory.

12. The computer system as claimed in claim 10, wherein the non-volatile memory block is a flash memory block, and the controller is configured to upload the boot code using a power-on auto-read operation, and generate the interrupt signal based on completion of the uploading.

13. The computer system as claimed in claim 10, wherein the controller is configured to generate the interrupt signal when pipelining becomes possible between the boot code upload and transmission of the boot code to the CPU.

14. The computer system as claimed in claim 10, wherein the memory in the SSD is a non-volatile random access memory (RAM).

15. The computer system as claimed in claim 14, wherein the controller is configured to upload the boot code and generate the interrupt signal based on the progress rate of the boot code upload at only initial boot of the computer system.

16. The computer system as claimed in claim 10, further comprising:
    a north bridge connecting the main memory to the CPU; and
    a south bridge connecting the SSD to the CPU.

* * * * *